Nov. 5, 1957
J. L. PORTER
2,812,239
EXTRACTING ALUMINA FROM ALUMINA AND ALUMINUM
PHOSPHATE ORES IN ONE LIQUOR
Filed July 8, 1953
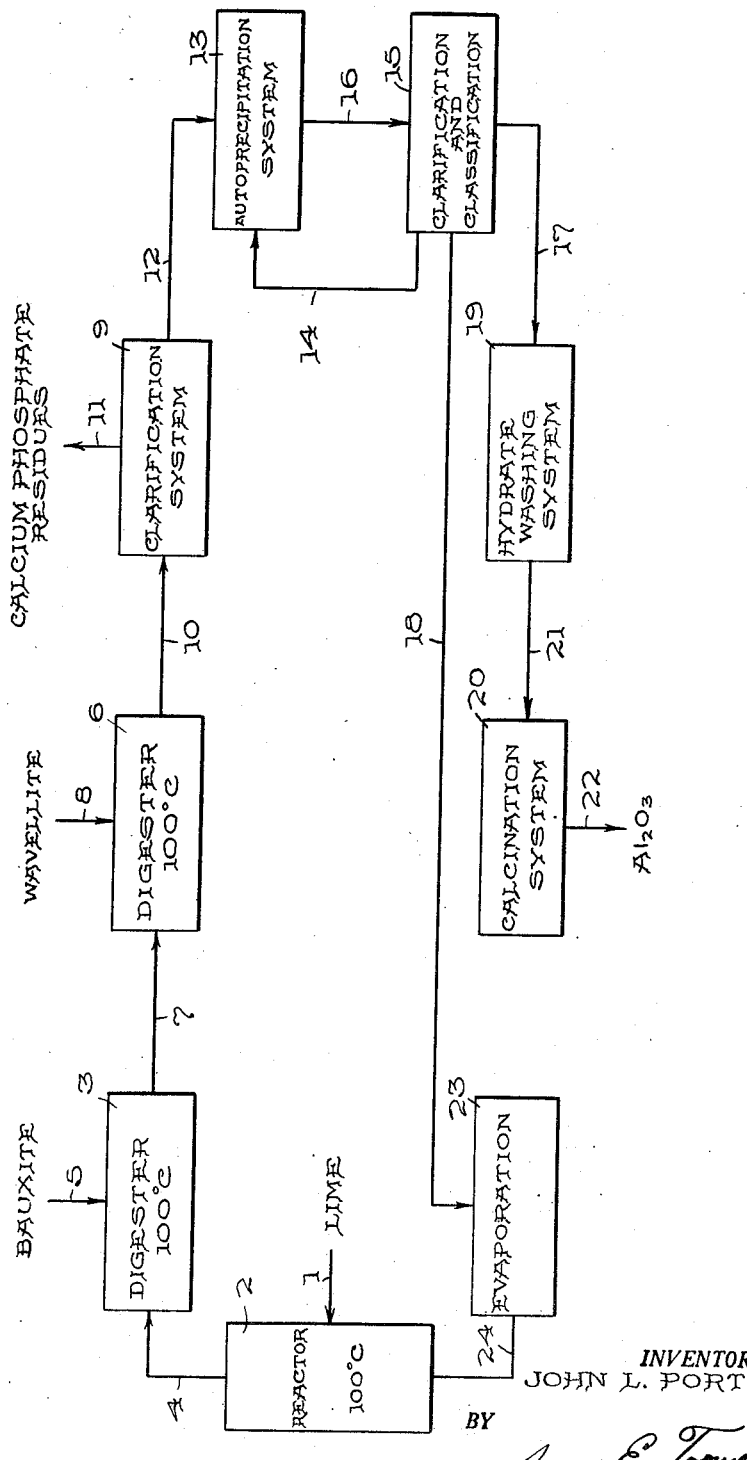
INVENTOR.
JOHN L. PORTER
BY
James E. Tooney
ATTORNEY

2,812,239

EXTRACTING ALUMINA FROM ALUMINA AND ALUMINUM PHOSPHATE ORES IN ONE LIQUOR

John L. Porter, Baton Rouge, La., assignor to Kaiser Aluminum & Chemical Corporation, Oakland, Calif., a corporation of Delaware Application July 8, 1953, Serial No. 366,744

19 Claims. (Cl. 23—143)

This invention relates to a method for treating aluminous ores. More particularly, the invention relates to a wet alkaline method for recovering alumina and/or alumina hydrate from aluminous ores. Specifically, the invention relates to a method for recovering alumina and/or alumina hydrate from more than one ore containing aluminous values wherein one of the ores contains alumina values predominantly as an aluminum phosphate.

In general, the Bayer type of alkaline process for recovering alumina from aluminous ores has been found to be the most economical and practical when the ore contains the alumina values mainly in the hydrated form. Thus, the principal raw material used in the European version of the Bayer process is the more geographically available monohydrate alumina or Boehmite, whereas the Gibbsite or trihydrate alumina containing ores are processed in the American plants. Although basically the process as operated in Europe and America is the same, that is, being a digest of the alumina containing ore in caustic solutions under pressure to obtain high aluminate containing solutions of caustic aluminate, which, after separation of the residues and cooling, may be treated for the recovery of the alumina content according to conventional autoprecipitation practice, the extraction conditions required for the monohydrate types of ores are more drastic, in that higher caustic soda concentrations are required as well as higher temperatures as compared to the extraction conditions in processes employing trihydrate alumina containing bauxites for equivalent amounts of alumina extracted per unit of caustic soda.

Furthermore, of considerable importance in the alkaline treatment of bauxites according to conventional processing conditions, whether monohydrate or trihydrate containing aluminous ores are processed, is the amount of silica present with the ores. The silica provides a source for the loss of otherwise recoverable alumina as well as the soda used for extraction purposes because it is solubilized in the caustic liquors and reacts with the soda and aluminate contents thereof to form insoluble sodium aluminum silicate complexes. Accordingly, in the Bayer operations, whether in America or Europe, processing of bauxites containing relatively small amounts of $SiO_2$ is highly desirable. In general, low silica bauxites, as referred to herein, contain less than about 6% $SiO_2$ whereas high silica bauxites contain greater than about 6% and sometimes as high as 20% $SiO_2$.

In America the problem of utilizing high silica bauxites has become increasingly important in that the low silica raw materials are usually found in remote places, such as South America, and the known supplies are limited. On the other hand, high silica bauxites are in more or less plentiful supply within the United States itself. Several processes have been devised for the utilization of these domestic high silica containing bauxites based on the alkaline type of extraction; yet in general, they have been uneconomical and cumbersome to operate, principally because the soda and alumina values insolubilized during the extraction phases through the formation of the insoluble silicate complexes can be recovered only by expensive sintering operations. Accordingly, with the increasing demand for metallic aluminum, the quest in America for sources of low silica bauxites has increased, and the industry has resorted to the utilization of the mixed monohydrate and the trihydrate aluminous ores such as found in Jamaica. For the complete recovery of the available alumina content of these mixed hydrated alumina containing bauxites, higher caustic soda concentrations and temperatures are employed for extraction purposes, necessarily leading to the more expensive processing conditions associated with European Boehmite ore practice. However, the more drastic extraction conditions, although more costly than in normal American Gibbsite practice, are less expensive to employ than either suffering the alumina and soda losses when high silica bauxites are processed according to the conventional wet practices or recovering the soda and alumina values by the expensive sinter methods.

It should be pointed out that the digestion conditions necessary and heretofore used for extracting the hydrated alumina from bauxites have been dictated principally by the alumina to caustic soda ratios desired in the green liquors for economic recoveries of the caustic solubilized alumina values according to conventional autoprecipitation practice. For example, the green caustic aluminate liquors resulting from the alkaline decomposition of bauxite have an alumina to caustic soda ratio varying in amounts from about .57 in European Boehmite practice wherein the higher caustic soda concentrations and temperatures are employed to about .62 in American Gibbsite practice. According to conventional autoprecipitation operations, the spent liquors resulting therefrom range in general from an alumina to caustic soda ratio (A/C) of about .25 to about .35 depending upon the length of time to which the liquors are subjected to autoprecipitation and the amounts of seed used for promoting the reaction. It becomes apparent, therefore, that only about one-half of the alumina content of the caustic aluminate liquors is recovered as alumina trihydrate during the autoprecipitation recovery phases of the process and that caustic aluminate solutions high in alumina content are especially desirable as feed to the autoprecipitation operation since the finishing A/C ratios are more or less the limiting factor as regards the amount of alumina recovered per cycle.

In processing the high silica trihydrate alumina containing bauxites to obtain the green liquors of high A/C ratio necessary for the autoprecipitation operation, it has been necessary heretofore to subject the ores to conditions of caustic soda concentration and temperature found as for example in the American type of Bayer operation. These high temperatures and caustic soda concentrations promote the solubilization of the siliceous components of the ore in the alkaline liquors and further promote the insolubilization of these siliceous components as sodium aluminum silicate complexes. Consequently, heretofore it has been the practice to either suffer the losses of soda and alumina with the products of desilication or employ a sinter operation for their recovery in order to obtain the high A/C ratio green liquors suitable for economic recovery of the alumina content by autoprecipitation.

According to the invention, a process has been devised especially adaptable to the processing of high silica bauxite wherein the high temperatures and/or caustic soda concentrations associated with normal Bayer plant practice can be avoided; yet the high alumina to caustic soda (A/C) ratios associated therewith can be obtained.

It has been discovered that the principal factor influencing the solubilization of silica during the alkaline treatment of bauxites containing siliceous material is the high temperatures required for attainment of the high A/C ratio green liquors and that substantially all of the caustic soluble alumina in the bauxite may be extracted under milder conditions as regards temperature without excessive losses of alumina and soda through the formation of insoluble desilication products. As is obvious to those skilled in the art, the high A/C ratios necessary for efficient autoprecipitation operations cannot be attained under these milder temperature conditions during an extraction phase operated on hydrated alumina containing ores. Consequently, as an added step, to obtain green caustic aluminate liquors suitable for autoprecipitation operations, it is contemplated by the herein described invention to extract the aluminum phosphate content from ores containing minerals such as wavellite or pseudo wavellite to obtain high A/C ratio green caustic aluminate liquors suitable for autoprecititation operations. Thus, the available alumina content of the bauxites may be extracted by an alkaline treatment to obtain an intermediate alumina to caustic soda ratio in the liquor between the A/C ratio of the spent liquor and the green liquor suitable for autoprecipitation by employing milder digesting conditions. In other words, this extraction liquor of intermediate alumina-to-caustic soda ratio contains excess caustic soda over that which has combined with alumina to form sodium aluminate. Therefore, the liquor retaining excess caustic soda has an extraction potential with respect to alumina for further formation of sodium aluminate. Thereafter, the high alumina to caustic soda ratios necessary for efficient autoprecipitation hydrate recovery operations may be obtained by digesting an aluminum phosphate containing ore in the liquors resulting from the bauxite digest. The $P_2O_5$ content of the aluminum phosphate containing ore which is solubilized during the caustic reaction with the aluminous phosphatic ore may be removed from the caustic aluminate liquors in known manner to obtain liquors suitably low in $P_2O_5$ content for the autoprecipitation operation. Thus, the invention contemplates a two-step extraction process wherein an aluminous ore is digested to produce a caustic aluminate solution of intermediate alumina content followed by the digest of an aluminum phosphate containing ore such as wavellite or pseudo wavellite found, as for example, in Florida as the overburden in the bone phosphate fields to increase the alumina content of the liquors.

Accordingly, it is the object of the herein described invention to provide a process for extracting alumina from aluminous ores characterized by the use of two or more ores containing aluminous values, one of which contains its alumina content predominantly as aluminum phosphate.

According to another object of this invention it is intended to provide a process for the treatment of high silica containing bauxites by the wet alkaline methods whereby the alumina and soda losses heretofore associated with the alkaline treatment of high silica ores will be substantially minimized.

Furthermore, it is an object of this invention to provide an alkaline extraction process wherein the caustic solutions resulting from the alkaline decomposition of bauxites may be employed for the subsequent extraction of alumina and phosphate values from aluminum phosphatic ores prior to the recovery of alumina content therefrom.

It is a further object to provide a process for the economic utilization of high silica containing bauxite which will enable green liquors suitable for autoprecipitation to result without having to suffer excessive losses of soda and alumina as insoluble silicates during extraction operations.

As indicated in my co-pending application S. N. 351,438, filed April 27, 1953, the alkaline extraction of aluminum phosphate from wavellite type of ores may be carried out to obtain alumina to caustic soda ratios (A/C) higher than normally found in Bayer plant practice while utilizing relatively low temperatures and caustic soda concentrations during the extraction phase, as compared to alkaline conditions normally required with other aluminous ores. By utilizing the mild conditions, excessive solubilization of the siliceous matter from the wavellite type ores and resulting loss of alumina and soda values is avoided. By utilizing similar conditions for the solubilization of the aluminous values from bauxites containing silica in appreciable amounts, it has been discovered that excessive silica solubilization can likewise be avoided and caustic aluminate liquors containing alumina in substantial amounts obtained which, although not suitable for the economic recovery of the alumina content by autoprecipitation, may be enriched in alumina content to obtain the high alumina to caustic soda ratios desirable for economic autoprecipitation operations, by digesting the aluminum phosphate content of wavellite type ores therein.

As is apparent from a consideration of the aforementioned co-pending application, the $P_2O_5$ content of the green liquors resulting from the two-step extraction process may be insolubilized in one of several known manners to obtain the phosphate free green caustic aluminate liquor suitable for the production of reduction grade alumina. Thus, lime may be employed for insolubilization of the $P_2O_5$ content of the green caustic aluminate liquors as calcium phosphate or, as is well known to those skilled in the art, the phosphate content can be insolubilized from the caustic aluminate liquors by cooling the green liquors to around 0° C., whereby the sodium phosphate is precipitated therefrom.

Still another method of removing the $P_2O_5$ content of a green caustic aluminate liquor is to employ calcium aluminate for reaction therewith so as to maintain simultaneous to the dephosphating reaction as high an alumina to caustic soda ratio as possible. Thus, in straight lime dephosphating the soda values associated with the phosphate values in solution are freed, thereby increasing the caustic soda concentration of the solution and decreasing the overall A/C ratio. This, of course, is to be avoided from the standpoint of autoprecipitation operations. By employing calcium aluminate, the alumina values associated therewith are simultaneously solubilized, negating, to the extent of their solubilization, the decrease in A/C ratio accompanying the phosphate causticizing reaction through the formation of caustic soda.

Consequently, as an added feature of the process herein described, to enable the utilization of the greater amounts of bauxite in proportion to the amount of aluminum phosphate ore required, it is contemplated to reduce the alumina to caustic ratio of the spent liquors resulting from the autoprecipitation phase of the process by reacting lime or its equivalent therewith to form insoluble calcium aluminate. The calcium aluminate thus produced may be allowed to carry through the bauxite extraction phases to the aluminum phosphate extraction phase of the process or separated and used for dephosphating subsequent to the wavellite extraction phase, wherein it will react with the solubilized sodium phosphate to form insoluble calcium phosphate and soluble sodium aluminate. In this manner, the calcium aluminate, formed prior to the extraction phases, decreases the A/C ratios of the spent liquors thereby allowing a greater amount of alumina to be supplied from the bauxite (since the intermediate ratio is determined by the solubility of alumina in caustic solutions under the conditions prevailing during said extraction phase as regards caustic soda concentration and temperature) and also provides a method of dephosphating the caustic aluminate liquors resulting from the extraction of the alumina and phosphate values from the wavellite type of ore.

A novel feature of the invention lies in combining the high alumina to caustic soda ratios obtainable through the alkaline processing of aluminum phosphate containing ores to obtain green caustic aluminate liquors highly suitable for the economic recovery of alumina trihydrate by autoprecipitation operations with the alkaline extraction of the alumina content of hydrated alumina containing ores such that a substantal portion of the alumina content of the green caustic aluminate liquors is supplied by the latter. Still another novel feature is the employment of extracting conditions such that the losses through the formation of insoluble silicates are minimized. Moreover, when operated in the preferred manner of the invention, the less desirable and more costly extracting conditions for recovering alumina from aluminous ores can be avoided while still obtaining green caustic aluminate liquors comparable to those found when processing bauxites in conventional practice. The process is ideal for the utilization of the plentiful high silica containing aluminous ores as a source of alumina hydrate since the high alumina to caustic soda ratios suitable for autoprecipitation operations may be obtained while simultaneously avoiding the uneconomical losses of otherwise recoverable alumina and extracting soda.

Furthermore, although presented herein as a preferred method for dephosphating the pregnant caustic aluminate liquors arising from the decomposition of the aluminum phosphatic ores, it is apparent to those skilled in the art that other methods are applicable for obtaining a sufficiently dephosphated caustic aluminate liquor suitable for the production of a reduction grade alumina after autoprecipitation and calcination. Thus, to increase the percent of the total alumina obtained from the bauxites, the dephosphating of the green caustic aluminate liquor is carried out by forming calcium aluminate in the spent caustic aluminate liquors by adding lime prior to the digesting phases which reacts subsequently to form insoluble calcium phosphate.

The use of lime to decrease the A/C ratio in the spent caustic aluminate liquors prior to the extraction phases has an added benefit, as mentioned hereinbefore, other than permitting greater quantities of alumina to be extracted from the high silica bauxites, in that the decrease in A/C ratio accompanying lime dephosphating of the pregnant caustic aluminate liquors is minimized. Thus, the soda values which are associated with the $P_2O_5$ content of the liquors are freed by the reaction with lime; thereby increasing the caustic soda content (C) of the green caustic aluminate liquors and decreasing the alumina to caustic ratio (A/C). This is obviously undesirable for autoprecipitation purposes from a yield standpoint of view. By employing calcium aluminate for the dephosphating reaction the alumina associated with the calcium aluminate is solubilized simultaneously to the insolubilization of calcium phosphate; thereby adding alumina to a substantial extent to the pregnant liquors and minimizing the effect of the soda freed during the reaction.

As used herein (A) represents the alumina in solution and is reported as the equivalent $Al_2O_3$. The caustic soda (C. or C. S.) represents the caustic soda in solution as sodium aluminate and as free sodium hydroxide (NaOH). Furthermore, the total soda (S. or T. S.) represents the sum of the caustic soda (C) and the soda associated with the soluble sodium carbonate in the liquor. The $P_2O_5$ content is reported separately and the soda values associated therewith can be determined therefrom. All soda values are herein reported as the equivalent sodium carbonate with the exception hereinafter specifically indicated.

As is apparent to those skilled in the art, the intermediate A/C ratio may be obtained under a wide variety of processing conditions as regards caustic soda concentration and temperature, depending on the type of hydrated alumina present in the bauxite being utilized as the source of alumina and the particular intermediate A/C ratio under consideration. Thus, at a temperature of 100° C. the solubility of alumina in caustic solution of about 185 grams per liter is an A/C ratio of about .25 when processing monohydrate alumina containing ores. On the other hand, when processing trihydrate alumina ores, A/C ratios better than .45 are possible under the same conditions as regards caustic soda concentration and temperature. Generally, however, an increase in caustic soda concentration and/or increase in temperature will increase the amount of alumina soluble therein. For example, in the European practice, Boehmite ores are subjected to the Bayer process caustic concentrations of about 425 grams per liter and temperatures of about 200° C. yielding an A/C ratio of around .58, whereas in the American plants which utilize Gibbsite ores, caustic soda concentrations of 170 grams per liter at temperatures of about 145° C. are productive of A/C ratios as high as about .62.

On the other hand, when utilizing a high silica bauxite as a source of alumina during the first step of the two-stage extraction process herein described, temperatures below those normally found in Bayer operations employing low silica bauxites should be used in order to minimize the loss of soda and alumina through the formation of insoluble sodium aluminum silicates. Temperature conditions between about 90° and 110° C. are preferred, as higher temperatures materially increase the amount of soda and otherwise available alumina which is lost. Thus, with high silica bauxites intermediate A/C ratios in excess of about .50 are to be avoided since the more drastic conditions which promote excessive silica solubilization become necessary for the attainment thereof. The material presented in Table I brings out the effect of high temperatures in promoting the loss of soda values during digestion operations wherein high silica bauxites are processed.

For the material therein presented, a high silica bauxite having an alumina content of 51% and an $SiO_2$ content of about 11% was digested in a caustic soda solution of about 165 grams per liter caustic soda for 30 minutes under varying digestion temperature conditions. Thereafter, the residues were analyzed for the soda and silica content. Thus, the soda to silica ratio ($Na_2O/SiO_2$) is indicative of the amount of soda lost through the formation of the insoluble sodium aluminum silicate complexes. (The soda value used in this ratio is reported as $Na_2O$ and not as sodium carbonate as used in reporting other soda values herein. All ratios used in this application unless otherwise indicated are reported on a weight basis.)

Thus, when employing a temperature of about 150° C., the soda to silica ratio ($Na_2O/SiO_2$) was .298 in run 1. In run 2 and subsequent runs, wherein the temperature of the digest were progressively decreased, the amount of soda that was insolubilized and lost with the residues also decreased. Thus, the $Na_2O/SiO_2$ ratio in the red mud residues from the digestion operation carried out at 130° C., as in run 2, was .258, significantly lower than in run 1 wherein a temperature of 150° C. was employed for the digest. In decreasing the temperature to 115° C., as in run 3, a soda to silica ratio in the insoluble residues of .176 resulted. By carrying the digestion operation out at 100 C. approximately 75% of the soda values otherwise lost in a 150° C. digest remains soluble. Thus, for run 4 wherein the temperature during the digestion operation was 100° C., the soda to silica ratio in the insoluble residues was .076.

Table I

| Run | Temperature, °C. | Na₂O/SiO₂ (Mud) |
|---|---|---|
| 1 | 150 | .298 |
| 2 | 130 | .258 |
| 3 | 115 | .176 |
| 4 | 100 | .076 |

Concerning the caustic soda concentration during the extraction of the alumina content from high silica containing bauxites, caustic soda concentrations between about 140 grams per liter and 240 grams per liter may be employed under the temperature conditions hereinbefore advocated for the extraction of the alumina from bauxites for the purpose of minimizing the solution of silica and subsequent reaction thereof with soda and alumina to form the undesirable sodium aluminum silicate complexes. Higher caustic soda concentrations are to be avoided since the losses of alumina and soda through the formation of insoluble silicates increases therewith. For practical operations, it is preferable to utilize caustic soda concentrations between about 170 and 225 grams per liter in order to obtain sufficiently high intermediate alumina to caustic soda ratios in the liquors resulting from the digest while simultaneously avoiding excessive solution of silica with the resulting formation of the insoluble silicates. Thus, the silica solubilized and losses therefrom also increase with caustic soda concentration although the higher temperatures are by far the most influencing factor. It is, of course, understood by those skilled in the art that the intermediate A/C ratio obtained as a result of the bauxite digest is determined somewhat by the conditions required for the control of the amount of silica solubilized. Thus, while higher alumina to caustic soda ratios may be obtained by increasing either the caustic soda concentration or the temperature during the digestion phase or both, when utilizing high silica bauxites the higher concentrations of caustic soda and temperatures are to be avoided for the purpose of controlling the losses of alumina and soda.

With regard to the second step of the herein described process wherein the liquors resulting from the bauxite digest are increased in alumina content by extracting the aluminous values from an aluminum phosphatic ore, digestion temperatures between about 80° C. and the atmospheric boiling point thereof are preferred since the ores containing the mineral wavellite normally also contain appreciable amounts of siliceous material. Nevertheless, the high A/C ratios indicated in the aforementioned copending application and highly desirable for autoprecipitation operations may be obtained under digesting conditions as high as 150° C. as well as at the lower preferred temperatures. However, for the purpose of minimizing the solution of the silica associated with the wavellite type ores, the lower temperature conditions around 100° C. for extraction purposes are preferred and especially so when the insoluble residues from the bauxite extraction phase carry through the second extraction step prior to being removed therefrom.

Caustic soda concentrations during the wavellite type of digestion step for the purpose of increasing the alumina content of the liquors resulting from the bauxite digest may be from about 50 to about 400 grams per liter caustic soda. However, the preferred range of operation for the purpose of minimizing the solution of silica and resulting loss of alumina and soda as insoluble sodium aluminum silicates is between about 150 and 200 grams per liter caustic soda, optimum economical conditions calling for around 180 grams per liter caustic soda for the second step of the two-stage extraction process herein described.

As a specific example of the combination process herein described wherein a bauxite is digested in caustic aluminate spent liquors to an intermediate alumina to caustic soda (A/C) ratio and thereafter a wavellite type of ore is subjected to extraction of its alumina content in the liquors resulting from the bauxite extraction phase, the material in Table II is presented.

Table II

|  | Run 1 | Run 2 |
|---|---|---|
| Spent liquor: | | |
| Al₂O₃ (grams/liter) | 62.46 | 62.46 |
| C. S. (grams/liter) | 178.9 | 178.9 |
| T. S. (grams/liter) | 198.3 | 198.3 |
| Al₂O₃ (grams in sample) | 6.246 | 6.246 |
| C. S. (grams in sample) | 17.89 | 17.89 |
| T. S. (grams in sample) | 19.83 | 19.83 |
| A/C | .349 | .349 |
| C/S | .901 | .901 |
| Bauxite: | | |
| Amount Added (grams) | 2.678 | 2.678 |
| Al₂O₃ (percent) | 51 | 51 |
| SiO₂ (percent) | 11.3 | 11.3 |
| Treatment— | | |
| Time (minutes) | 20 | 20 |
| Temperature (° C.) | 100 | 100 |
| Green Liquor of Intermediate Al₂O₃ Content— | | |
| Al₂O₃ (grams) | 7.365 | 7.365 |
| SiO₂ (grams) | .1004 | .1004 |
| P₂O₅ (grams) | .007 | .007 |
| C. S. (grams) | 17.67 | 17.67 |
| A/C | .417 | .417 |
| Results of Bauxite Digest— | | |
| Al₂O₃ extracted (grams) | 1.119 | 1.119 |
| Al₂O₃ extracted (percent) | 82 | 82 |
| Al₂O₃ available in Bauxite (percent) | 41.8 | 41.8 |
| Wavellite: | | |
| Amount Added (grams) |  | 9.367 |
| Al₂O₃, percent |  | 32.42 |
| P₂O₅, percent |  | 27.62 |
| SiO₂, percent |  | 10.24 |
| CaO, percent |  | 6.61 |
| Treatment | | |
| Time (minutes) |  | 20 |
| Temperature (° C.) |  | 100 |
| Green Liquor Obtained— | | |
| Al₂O₃ (grams) |  | 9.898 |
| SiO₂ (grams) |  | .1405 |
| P₂O₅ (grams) |  | 2.016 |
| A/C |  | .747 |
| Results of Wavellite Digest— | | |
| Al₂O₃ extracted (grams) |  | 2.533 |
| Al₂O₃ extracted (percent) |  | 83.3 |
| Al₂O₃ available in wavellite (percent) |  | 27 |
| P₂O₅ extracted (grams) |  | 2.009 |
| P₂O₅ extracted (percent) |  | 77.7 |
| P₂O₅ available in wavellite (percent) |  | 21.5 |
| Overall Results: | | |
| Percent Al₂O₃ from bauxite |  | 30.7 |
| Percent Al₂O₃ from wavellite |  | 69.3 |

For comparative purposes two separate runs were made, run 1, being merely a digest of a high silica containing ore to an intermediate A/C ratio and run 2 repeating identically the conditions under run 1 for the bauxite digest whereafter the liquors resulting therefrom were used to extract the aluminous values from a wavellite type ore.

In run 1, 2.678 grams of a high silica bauxite of the Arkansas type, having 51% alumina and 11.3% SiO₂, was digested for 20 minutes at 100° C. in an artificial spent liquor having a caustic soda concentration of 178.9 grams per liter and the characteristic A/C and C/S ratios of .349 and .901 respectively. Thereafter, the resulting liquor of an intermediate Al₂O₃ content between the spent liquor and green caustic aluminate liquor suitable for autoprecipitation operations were analysed. It was found that 82% of the Al₂O₃ had been extracted under these mild digesting conditions indicating an available alumina content of 41.8% in the bauxite. Thus, the A/C ratio of the spent liquor used for extraction purposes was .349 and the intermediate A/C ratio was .417.

Furthermore, contrary to those who advocate high temperatures during digestion to promote the insolubilization of the solubilized silica, it was found that only about 1 gram per liter SiO₂ resulted from the mild digest employed. In general, digestion times during the extraction phase with high silica bauxites greater than 30 minutes should be avoided. Preferably, periods under the extracting conditions as regards temperature and caustic soda concentration herein advocated of about 20 minutes should be employed for minimizing the amount of SiO₂ solubilized and subsequently losses of soda and alumina.

For run 2 the quantities and conditions for run 1 were repeated and immediately after the bauxite digestion step, 9.367 grams of a Florida wavellite containing 32.42% $Al_2O_3$, 27.62% $P_2O_5$, 10.24% $SiO_2$ and 6.61% CaO was added and digested therein for 20 minutes at 100° C. After analysis of the green liquors resulting from the wavellite type of digest it was found that the green liquors had an A/C ratio of .747, that 83.3% of the alumina content of the wavellite had been extracted giving an available alumina content of 27%. Moreover, 77.7% of the $P_2O_5$ content of the wavellite was solubilized indicating 21.5% of the wavellite as available $P_2O_5$ content. Still further, the $SiO_2$ content of the green liquors indicated only about 1.5 grams of $SiO_2$ per liter.

Overall, the bauxite contributed 30.7% of the alumina solubilized and the wavellite contributed 69.3%. Thus a substantial portion of the alumina for autoprecipitation purposes was contributed by the bauxite.

It has also been determined that when employing high silica containing bauxites, such as those found in Arkansas, the period during which the high silica containing residues are in contact with the extracting liquor during the first step wherein the alumina content of the bauxite is extracted should not be greater than about 30 minutes to avoid excessive losses of soda and alumina. Preferably, in the two-stage extraction process herein advocated, the first digestion step should be carried out under the conditions of temperature and caustic soda concentrations herein before indicated for periods of about 20 minutes prior to the wavellite or aluminum phosphate extraction step. It has been found that the alumina values are extracted under the above conditions in about 20 minutes and that greater times merely increase the amount of silica solubilized and losses of alumina and soda resulting therefrom.

Concerning the digest of wavellite in the liquors resulting from the bauxite digest, it is preferable to clarify the solution prior thereto when high silica containing bauxites are processed, since the insoluble residues containing appreciable amounts of silica from the bauxite digestion step will be subjected to processing conditions during the aluminum phosphate extraction phase quite similar to the conditions encountered in the bauxite digestion step. However, clarification between digests may be eliminated, as in the experiments, as an engineering expedient and the bauxite residues removed together with the wavelite residues. In the event that the residues are not separated, overall digestion times for the bauxite and wavellite should not be greater than about 60 minutes.

To show the effect of adding lime to form calcium aluminate and decreasing the alumina to caustic soda ratio of the spent liquors, the material in Table III is presented.

*Table III*

Spent liquor:
| | |
|---|---|
| $Al_2O_3$ (grams/liter) | 62.96 |
| C. S. (grams/liter) | 199 |
| T. S. (grams/liter) | 225 |
| A/C | .3163 |
| C/S | .8845 |
| $Al_2O_3$ (grams in sample) | 6.296 |
| C. S. (grams in sample) | 19.9 |
| T. S. (grams in sample) | 22.5 |

Treatment—
| | |
|---|---|
| CaO added (grams) | 3.64 |
| $CaO/Al_2O_3$ mol ratio charge | 1.05 |
| Time (minutes) | 30 |
| Temperature (° C.) | 100 |

Liquor resulting—
| | |
|---|---|
| $Al_2O_3$ grams/liter | 41.69 |
| C. S. grams/liter | 188 |
| A/C | .2217 |
| $Al_2O_3$ grams | 4.169 |
| C. S. | 18.8 |

Calcium aluminate—
| | |
|---|---|
| $CaO/Al_2O_3$ mol ratio | 3.1 |
| $Al_2O_3$ grams | 2.127 |

To a spent liquor of the indicated analysis an amount of 3.64 grams of CaO was added and reacted with a spent liquor for 30 minutes at a temperature of 100° C. The mol ratio of CaO in the lime charge to $Al_2O_3$ in the spent liquor was 1.05. After the reaction had proceeded for the indicated time the calcium aluminate was separated therefrom and the liquor analysed for its alumina and caustic soda contents. It was found that the ratio of lime to alumina ($CaO/Al_2O_3$) in the calcium aluminate was 3.1 and that 2.127 grams of alumina had been insolubilized. Furthermore, the alumina to caustic ratio (A/C) of the spent liquor originally was .3163 and after the formation of the calcium aluminate had decreased to .2217. It is apparent, therefore, that by employing the liquor resulting from the calcium aluminate formation step for the extraction of alumina from the bauxites that a greater amount of alumina can be solubilized from the bauxite per unit caustic soda employed for extraction. Thus, since the intermediate A/C ratio is defined by the bauxite digesting condition, utilization of a spent liquor having a lower A/C ratio than evolving from the autoprecipitation operations necessarily increases the amount of $Al_2O_3$ that can be extracted by said spent liquor under the same digestion condition.

As a specific example of the operation combining the two-stage digestion process wherein the spent liquors, decreased in alumina content by the formation of calcium aluminate with lime and where the reaction products are allowed to proceed through the digestion phases to dephosphate the caustic aluminate liquors resulting from the wavellite digest, the material in Table IV is presented.

*Table IV*

Spent liquor:
| | |
|---|---|
| $Al_2O_3$ (grams/liter) | 62.46 |
| C. S. (grams/liter) | 178.9 |
| T. S. (grams/liter) | 198.3 |
| $Al_2O_3$ (grams) | 6.976 |
| C. S. (grams) | 19.97 |
| T. S. (grams) | 22.15 |
| A/C | .349 |
| C/S | .901 |

Lime addition—
| | |
|---|---|
| CaO added (grams) | 3.36 |

Treatment—
| | |
|---|---|
| Time (minutes) | 30 |
| Temperature (° C.) | 100 |

Bauxite:
| | |
|---|---|
| Amount added (grams) | 7.31 |
| $Al_2O_3$ available (percent) | 39.5 |
| $SiO_2$ available (percent) | 11 |

Treatment—
| | |
|---|---|
| Time (minutes) | 30 |
| Temperature (° C.) | 100 |

Wavellite:
| | |
|---|---|
| Amount added (grams) | 11.28 |
| $Al_2O_3$ available (percent) | 27.7 |
| $P_2O_5$ available (percent) | 21.6 |

Treatment—
| | |
|---|---|
| Time (minutes) | 30 |
| Temperature (° C.) | 100 |

Green liquor—
| | |
|---|---|
| $Al_2O_3$ (grams) | 13.088 |
| $P_2O_5$ (grams) | .094 |
| $SiO_2$ (grams) | .302 |
| A/C | .683 |

Results:
| | |
|---|---|
| $Al_2O_3$ recovered (grams) | 6.112 |
| $Al_2O_3$ available in bauxite and wavellite recovered (percent) | 99 |

For the material presented 3.36 grams of CaO was added to a sample of an artificial spent caustic aluminate liquor having the characteristic A/C and C/S ratios of .349 and .901 and containing 6.976 grams of $Al_2O_3$ and reacted therewith at 100° C. for 30 minutes. Thereafter, a high silica bauxite having 39.5% available alumina and about 11% SiO$_2$ content was added to the calcium aluminate containing spent liquor and digested therein for 30 minutes at 100° C. Thereafter, 11.28 grams of a Florida wavellite having 27.7% available Al$_2$O$_3$ and 21.6% available P$_2$O$_5$ was added to the slurry from the bauxite digest and digested therein for 30 minutes at 100° C.

It was found from an analysis of the green liquor resulting that 99% of the total available alumina in the bauxite and wavellite had been extracted to produce a green liquor having an A/C ratio of .683. Furthermore, it is apparent that the solubilized P$_2$O$_5$ content from the wavellite had been substantially insolubilized by reaction with the calcium aluminate giving a solution containing only about 1 gram P$_2$O$_5$ per liter.

In general, sufficient calcium aluminate is produced to supply at least 3 mols of lime per mol of P$_2$O$_5$ in the wavellite to be insolubilized as calcium phosphate.

From the foregoing, it is obvious that the alumina content of high silica bauxites can be extracted to intermediate ratios of alumina to caustic soda and thereafter, the liquors resulting increased in alumina content by extracting the aluminous values from ores containing such minerals as wavellite or pseudo wavellite (crandellite). Moreover, when the bauxites contain appreciable amounts of silica the solubilization thereof, with resulting loss of alumina and soda values, can be minimized by carrying out the digestion reaction under the conditions as regards temperature and the caustic soda concentration hereinabove indicated.

Although the temperature is a most influencing factor in determining the loss of alumina and soda as insoluble desilication products, the length of time during which the siliceous material is in contact with the extracting liquors under digestion conditions is also of some importance. For example, the residues from the bauxite extraction phase may be allowed to proceed through the second step of the two-stage extraction process and clarified simultaneous to the clarification of the residues resulting from the wavellite extraction step. In this manner, the residues containing the siliceous matter from the bauxite digestion phase remain in contact with the extracting liquors throughout both phases of the two-step extraction process. Under such conditions, wherein the ore residues carry through to the second stage extraction step, it has been found that overall digestion times substantially greater than about one hour are to be avoided since the excessive times tend to allow greater quantities of silica to become solubilized and subsequently carry down valuable alumina and soda values as well as contamination of the calcined alumina product.

It is obvious, of course, that the residues from the bauxite extraction phase may be clarified from the green liquors of intermediate alumina content prior to the utilization of the liquors for extracting the aluminous values from the wavellite type ores. From the standpoint of decreasing the loss of alumina and soda as insoluble silicates, it is preferred that the residues from the bauxite extraction phase be separated immediately after the digest and prior to the wavellite type of digest. However, from an engineering standpoint of view the added equipment necessary for said clarification minimizes the advantages obtained thereby.

In general, the digest of the high silica bauxite should be carried out for a period not greater than about 30 minutes and preferably about 20 minutes when the unclarified effluent is led directly to the second stage extraction phase wherein the wavellite ores are added. Thereafter, the wavellite digest should be carried out for periods less than about 30 minutes when the wavellite type ores contain appreciable amounts of silica, as is usually the case with those obtained from the Florida bone phosphate fields.

It is preferable, again from the point of view of minimizing the amount of silica solubilized, that the clarification take place immediately after the wavellite type of digest since the extracting conditions as regards caustic soda concentration and temperature prevail during said clarification operations. However, it has been found that by cooling to about 60 to 70° C. the rate of the reaction of silica with the caustic solutions is diminished sufficiently so as to allow clarification operations to be carried out by settling.

Since the digestion operations in both the bauxite digestion phase and the wavellite digestion phase are carried out under atmospheric conditions as regards pressure, it is apparent to those skilled in the art that the solubilization reaction may be carried out simultaneous to the clarification operation. Consequently, the alumina from the bauxite may be extracted by the spent liquor at the same time the bauxite residues are being clarified by decantation. Likewise, the liquors resulting therefrom may be led to the wavellite extraction phase and the extraction operation carried out simultaneous to clarification.

It is apparent from the foregoing that the solubilization reactions may be carried out under a wide variety of operating conditions depending on the losses of alumina and soda which may be suffered as a result of the length of time required by the particular operation employed in which conditions of silica solubilization is maintained. However, the object in each situation is to maintain the ore in contact with the liquors under extracting conditions for a period of time sufficient to solubilize substantially all of the alumina content as is the case of bauxite, and aluminum phosphate content as is the case with wavellite, yet for a period of time insufficient to solubilize substantial quantities of siliceous material. This particular time of contact, of course, must be determined empirically, bearing in mind the economies associated with the losses that may be suffered and the equipment necessary for the operation.

The invention will be more fully understood by consideration of the schematic flowsheet presented wherein diagrammatically presented as one embodiment of the herein described process for utilizing both bauxite and wavellite for the recovery of the alumina content therefrom.

Line 1 is added to reactor 2 and slurried with spent liquor at about 100° C. to insolubilize a portion of the alumina content thereof as calcium aluminate. Thereafter, it is forwarded to digesting unit 3 through line 4, mixed with bauxite 5 and digested at about 100° C. to solubilize the alumina content from the bauxite. Thereafter, the caustic aluminate liquors of intermediate alumina content are forwarded to digesting unit 6 through line 7 wherein the ore containing the mineral wavellite is added at 8. The alumina phosphate content of the wavellite type of ore is extracted under temperature conditions of about 100° C., while simultaneously the calcium aluminate reacts with the sodium phosphate which is formed during the reaction and insoluble calcium phosphate is produced. The resulting slurry is led to clarification system 9 through line 10 wherein the calcium phosphate residues are removed as at 11. The clarified liquors are forwarded through line 12 to autoprecipitation system 13. At autoprecipitation system 13 the green caustic aluminate liquors are mixed with seed as through line 14 from clarification and classification system 15 and in well known manner the alumina content insolubilized in substantial amounts. From autoprecipitation system 13 the caustic aluminate liquors containing insoluble alumina trihydrate are led to clarification and classification system 15 through line 16 wherein the fine particles of hydrate are removed through line 14 for use as seed and the clarified liquors forwarded through line 18. The coarse hydrate particles are washed in hydrate washing system 19 and thereafter forwarded to calcination system 20 through line 21 wherein calcined alumina is removed as at 22. The spent caustic aluminate liquors may be forwarded to evaporation system 23, wherein they are concentrated to remove the water inserted in the system for washing purposes and with the ore as water of hydration among other sources. The concentrated liquors are then led to reactor 2 through line 24 wherein the calcium aluminate is formed by reaction with lime as previously indicated.

It is apparent that calcium aluminate may be employed for dephosphating purposes under various operating conditions. For example, the calcium aluminate formed in reactor 2 may be clarified from the spent caustic aluminate liquors and, subsequently, employed for dephosphating purposes after the residues resulting from the two-step digestion process are clarified. In this manner, the calcium phosphate is uncontaminated with the residues of the digestion phase.

It is apparent that other methods may be employed for removing the phosphate content of the pregnant liquors resulting from the wavellite digest as has previously been indicated. Accordingly, under such conditions as for example where the liquors are cooled to crystallize out the sodium phosphate, utilization of the reactor 2 will become unnecessary. Likewise, when lime is added directly to the pregnant caustic aluminate liquors to insolubilize the $P_2O_5$ content as calcium phosphate, the desirability of clarifying between digesters 3 and digester 6 as an economic expedient depends on whether the dephosphating reaction is to be carried out in the presence of clarified or unclarified liquors after or during the wavellite digest. Thus, where the reaction is more favorably carried out during digestion operations, it is preferable to obtain a calcium phosphate residue high in the $P_2O_5$ content, to clarify between the bauxite and wavellite digest.

It is furthermore apparent from the foregoing that the process is applicable to the utilization of both high silica and low silica bauxites in the preliminary digest. Therefore, the process is not to be construed as limited to the utilization of high silica bauxite but only in so far as limited by the claims herein presented.

What is claimed is:

1. In an alkaline process for the recovery of alumina from materials containing caustic soluble hydrated alumina wherein the material is digested in heated caustic soda-containing liquor to extract the caustic soluble alumina, and alumina is recovered by precipitation from the alumina-enriched liquor, the improved method of increasing the alumina content of the liquor from which alumina is recovered by precipitation, which comprises digesting an aluminous material containing caustic soluble alumina predominantly as hydrated alumina in said heated liquor to extract the caustic soluble alumina therefrom to obtain a liquor of intermediate alumina content having excess caustic soda remaining therein, and thereafter digesting in the resulting alumina-enriched heated liquor an aluminous material containing caustic soluble alumina predominantly as aluminum phosphate to extract the alumina and phosphate contents thereof.

2. A process according to claim 1 in which the phosphate extracted with the alumina from the material containing aluminum phosphate is reacted with calcium aluminate added to the caustic liquor to form insoluble calcium phosphate and additional caustic aluminate.

3. In an alkaline process for the recovery of alumina from materials containing caustic soluble hydrated alumina wherein the material is digested in heated recycled spent caustic aluminate liquor to extract the caustic soluble hydrated alumina therefrom, and alumina is recovered by precipitation from the alumina-enriched liquor, the improved method of increasing the alumina content in the liquor from which alumina is recovered by precipitation, which comprises reacting a substantial portion of the alumina remaining in the recycled spent caustic aluminate liquor with lime to form insoluble calcium aluminate and to reduce the alumina-to-caustic soda ratio of said spent liquor, digesting an aluminous material containing caustic soluble alumina predominantly as hydrated alumina in said recycled spent liquor of reduced alumina-to-caustic ratio to extract the caustic soluble alumina therefrom to obtain a liquor of intermediate alumina content having excess caustic soda remaining therein, thereafter digesting in the resulting alumina-enriched liquor an aluminous material containing caustic soluble alumina predominantly as aluminum phosphate to extract the alumina and phosphate contents thereof, and reacting the calcium aluminate formed by reaction of the lime and the alumina of the recycled spent liquor with the phosphate content of the extraction liquor to form insoluble calcium phosphate.

4. The process according to claim 3 wherein the amount of lime employed to transform the soluble aluminous values of the spent liquor to calcium aluminate is equivalent to about 3 mols of lime per mol of available $P_2O_5$ in the aluminum phosphate containing ore.

5. In an alkaline process for the recovery of aluminous values from aluminous ore wherein the ore is charged to heated caustic liquor and the caustic soluble aluminous values are extracted by digestion therein, the method of treating a high silica bauxite ore containing aluminous values predominantly as hydrated alumina and an ore containing aluminous values predominantly as aluminum phosphate for extracting the caustic soluble aluminous values therefrom comprising first charging said bauxite ore to said heated caustic liquor having a temperature not substantially in excess of the atmospheric boiling point thereof and digesting the ore to extract the caustic soluble aluminous values therein, and thereafter charging said aluminum phosphate containing ore to the heated caustic liquor resulting from the preceding digest and digesting ore to extract the caustic soluble aluminous values therein.

6. The process according to claim 5 wherein the high silica bauxite containing the aluminous values predominantly as hydrated alumina is digested under temperature conditions between about 90° C. and 110° C.

7. The process according to claim 5 wherein the high silica bauxite containing the aluminous values predominantly as hydrated alumina is digested under conditions as regards caustic soda concentration of from about 140 to 240 grams per liter caustic soda and under conditions as regards temperature between about 90° C. and 110° C.

8. The process according to claim 5 wherein the high silica bauxite containing the aluminous values predominantly as hydrated alumina is digested under temperature conditions between about 90° C. and 110° C. and conditions as regards caustic soda concentration of about 170 to 225 grams per liter.

9. The process according to claim 5 wherein the high silica bauxite containing the aluminous values predominantly as hydrated alumina is digested under conditions as regards caustic soda concentration of about 170 to 225 grams per liter at temperatures between 90° and 110° C. for a period of time not greater than about 30 minutes.

10. The process according to claim 5 wherein the ore containing the aluminous values predominantly as aluminum phosphate is digested under temperature conditions between about 80° C. and the atmospheric boiling point in caustic soda solutions having a caustic soda concentration from about 150 to 200 grams per liter caustic soda.

11. The process according to claim 5 wherein the ore containing the aluminous values predominantly as aluminum phosphate is digested for periods not greater than about 30 minutes under digesting conditions as regards temperature of from about 80° C. to the atmospheric boiling point thereof and under conditions as regards caustic soda concentration of from about 150 to 200 grams per liter caustic soda.

12. In an alkaline process for the recovery of aluminous values from aluminous ore wherein the ore is charged to heated caustic liquor and the caustic soluble aluminous values are extracted by digestion therein, the method of treating a high silica bauxite ore containing aluminous values predominantly as hydrated alumina and an ore containing aluminous values predominantly as aluminum phosphate for extracting the caustic soluble aluminous values therefrom and for transforming the caustic soluble phosphate values to calcium phosphate comprising first charging said bauxite ore to said heated caustic liquor having a temperature not substantially in excess of the atmospheric boiling point thereof and digesting the ore to extract the caustic soluble aluminous values therein, and thereafter charging said aluminum phosphate containing ore to the heated caustic liquor resulting from the preceding digest and digesting the ore to extract the caustic soluble aluminous and phosphate values therein in the presence of added calcium aluminate which reacts with the extracted phosphate values to produce insoluble calcium phosphate.

13. The process according to claim 12 wherein the high silica bauxite containing the aluminous values predominantly as hydrated alumina is digested under conditions as regards caustic soda concentration of about 170 to 225 grams per liter at temperatures between 90 and 110° C. for periods of time not greater than about 30 minutes.

14. The process according to claim 12 wherein the ore containing the aluminous values predominantly as aluminum phosphate is digested for periods not greater than about 30 minutes under digesting conditions as regards temperature of from about 80° C. to the atmospheric boiling point thereof and under conditions as regards caustic soda concentration of from about 150 to 200 grams per liter caustic soda.

15. In an alkaline process for the recovery of aluminous values from aluminous ore wherein the ore is charged to heated caustic liquor and the caustic soluble aluminous values extracted by disgestion therein and the extracted aluminous values are recovered subsequent to the separation of the residues from the caustic aluminate liquor produced thereby, the method of treating a high silica bauxite ore containing aluminous values predominantly as hydrated alumina and an ore containing aluminous values predominantly as aluminum phosphate for extracting the caustic soluble aluminous values therefrom comprising first charging said bauxite ore to said heated caustic liquor having a temperature not substantially in excess of the atmospheric boiling point thereof and digesting said bauxite ore therein to extract the caustic soluble aluminous values, and thereafter charging said aluminum phosphate containing ore to the heated caustic liquor resulting from the preceding digest and digesting said aluminum phosphate-containing ore to extract the caustic soluble aluminous values therein.

16. The process according to claim 15 wherein the residues of both ores are separated from the caustic aluminate liquor after the ore containing the aluminous values predominantly as aluminum phosphate is digested under temperature conditions between about 80° C. and the atmospheric boiling point.

17. The process according to claim 15 wherein the residues resulting from the digest of the high silica bauxite containing the aluminous values predominantly as hydrated alumina are separated from the liquor prior to the digest of the ore containing the aluminous values predominantly as aluminum phosphate.

18. The process according to claim 15 wherein the insoluble residue of the high silica bauxite containing the aluminous values predominantly as hydrated alumina remains in contact with the liquor during both digests for a period of time not greater than 60 minutes.

19. The process according to claim 15 wherein the liquors obtained from the digest of the aluminum phosphate containing ore are cooled to from about 60 to 70° C. prior to separation of the residues therefrom.

References Cited in the file of this patent

UNITED STATES PATENTS

| | | |
|---|---|---|
| 2,557,891 | Porter | June 19, 1951 |
| 2,591,436 | James | Apr. 1, 1952 |